United States Patent Office 2,777,284
Patented Jan. 15, 1957

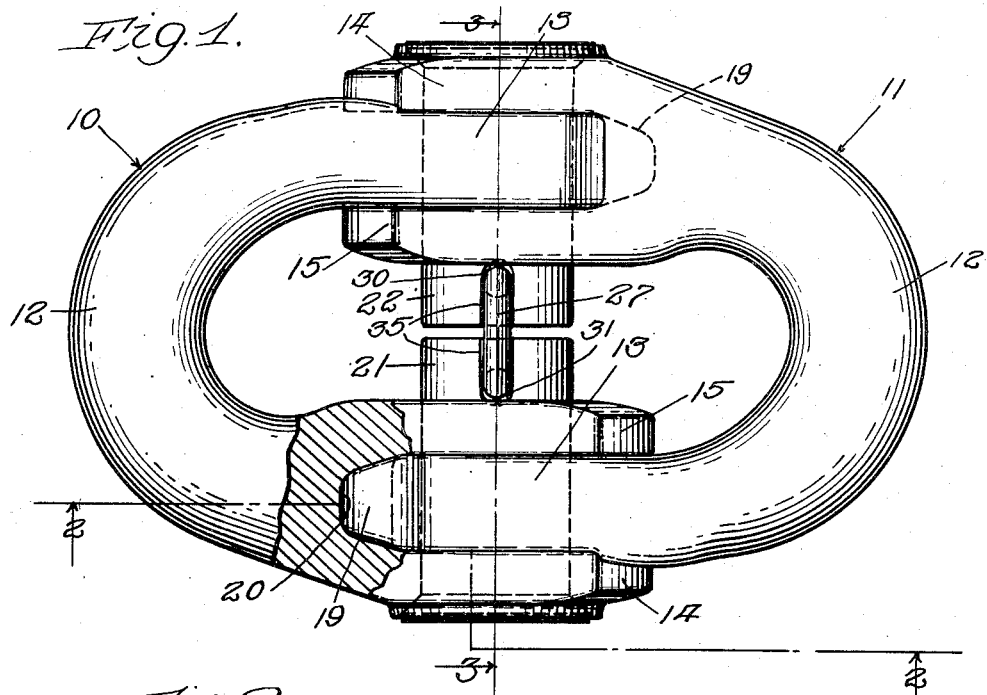
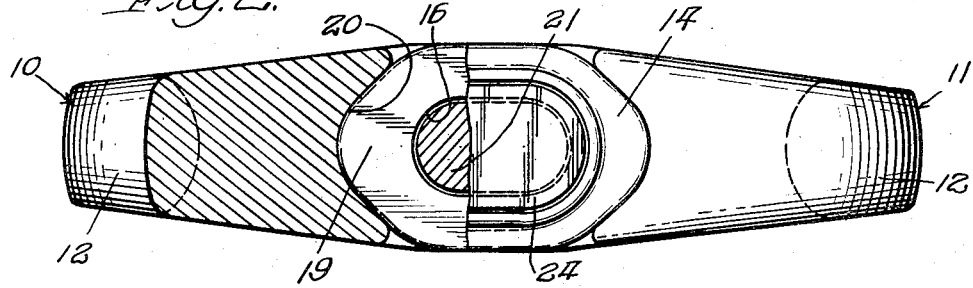
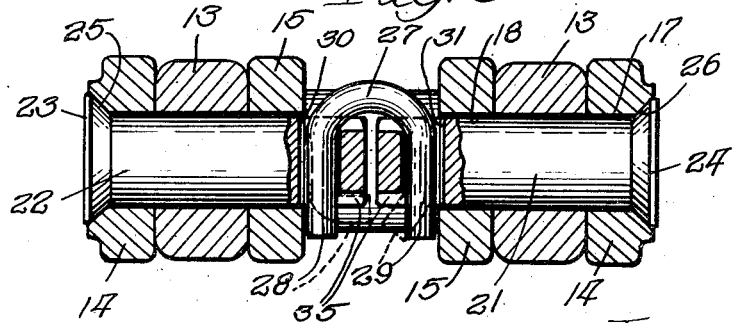

2,777,284

TWO PART CHAIN LINK WITH TWO ALIGNED PINS HOLDING SAID PARTS TOGETHER

John W. Page, Chicago, Ill., assignor to Page Engineering Company, a corporation of Illinois Application September 13, 1954, Serial No. 455,615

2 Claims. (Cl. 59—85)

This invention relates to a chain link and more particularly to a link for relatively heavy chains which can be used in the field for repairing purposes.

Large earth moving equipment utilizes heavy chains, for instance in the support of a dragline bucket. Ordinarily, the dragline is used at a location far from shops in which repairs could be made so that the necesary equipment to make repairs has to be taken to wherever the dragline is located. Any breakdown of the equipment can be quite costly since the lost time represents a very appreciable loss of money.

In the past, equipment used to repair heavy chains has necessitated ordinarily some type of welder. There has not been an entirely satisfactory repair link for heavy chains which could be placed in a chain in the field with the most rudimentary of tools. The chain link of the present invention utilizes parts which may be easily slipped together and then securely locked together with the use of a hammer or equivalent tool. No additional equipment is required and the ordinary mechanic can place the repair link in a chain without instruction.

It is therefore the general object of this invention to provide a chain link which may be put together with the usualy available ordinary type of tool.

A further object is to provide a repair link for chains which may be easily and economically formed in cast steel without requiring machining.

A further object is to provide a chain link of simple design with parts which are interchangeable to eliminate a multiplicity of parts necessary to complete a particular link.

Other features, advantages and objects of the present invention will be apparent from the following description of an embodiment of the invention taken in conjunction with the accompanying drawings, in which:

Figure 1 is a plan view, partially broken away, of an assembled chain link of this invention;

Figure 2 is a vertical sectional view of the chain link taken substantially along line 2—2 in Figure 1; and Figure 3 is a vertical sectional view of the chain link at right angles to the section of Figure 2 and taken substantially along line 3—3 in Figure 1.

The chains with which the present link is to be used are ordinarily of cast links formed of a high manganese bearing steel. The links are thus capable of widthstanding very high shock loads. The chains are ordinarily designated in size by the diameter of the narrowest portion of any part of the link and the chains with which the repair link is intended for use vary in size from 1¼ inches up to 3 inches. The principle of the invention, however, may be utilized with chains of smaller size and of different base material. The principle is applicable to smaller chains but has its primary useful function in the larger chains requiring such heavy links that usual procedures could not be used to repair a broken chain.

In general, the present chain link embodies a pair of half links which are interchangeable, that is to say that each half link is of the same shape and size. The half links each comprise about one-half of an ordinary link severed on a lateral median line with the necessary structure for securing the half links together. Each is generally U-shaped and provided with apertured parts at the extremities of the U which permit it to be assembled with a similar half link to complete the structure. Pins are utilized to secure two half links together and a keeper, which may be locked in place with a few hammer blows, secures the pins in proper position.

Referring to the drawings, it will be noticed that the specific structure illustrated includes a half link 10 and and a similar half link 11, each of which has a rounded body portion 12 terminating at one end with an eye portion 13 and at the other end with a pair of spaced apertured ears 14 and 15. The ear 14 is on the outer side of the link as assembled and the ear 15 is on the inside.

Each of the half links is cast of high manganese steel in the form as illustrated in the drawings so that no machining is necessary. The eye portion 13 is formed with an aperture 16 adjacent the end thereof. The ear portions 14 and 15, which are similar to a clevis, are also formed with apertures 17 and 18 respectively which are aligned laterally with the aperture in the eye portion when the links are placed in interfitting relation. Each of the apertures is shown in its outline in Figure 2 as being abround, that is a long dimension longitudinally of the link and a short dimension normal thereof so that the cross section of the aperture is oblong rather than round. Each eye portion 13 is also provided with structure which helps to keep the half links in a single plane. A nose portion 19 is formed opposite the aperture 16 and at the extremity of the eye portion so that it may fit into and seat against a recess 20 formed in the hollow between the apertured ears 14 and 15 of the clevis portion. The curvature of the nose portion is such that when the nose and recess are abutted, the links are held against turning one out of the plane of the other. This prevention of turning is helped, of course, by the pins which secure the half links together.

Two pins are utilized to secure the half links together. One pin 21 is inserted into the aligned apertures on one side of the link which another pin 22 is inserted on the opposite side. As described just above, the seated nose and recess along with the pin in the aligned apertures prevent the half links from pivoting out of a single plane. Each pin is also of abround shape so that it fits into and substantially fills the aligned apertures. A head 23 and 24 respectively is formed on the pins so that they may seat against the outer tapered seat 25 and 26 respectively in the outer apertured ear 14.

All of the parts of the repair link thus far described may simply be placed together by manual operations. The two half links are brought together so that the apertures in their extremities are aligned and the pins are inserted by hand. In order to maintain the half links together, a keeper is provided to hold the pins 21 and 22 within the aligned apertures. This keeper takes which has its legs 28 and 29 inserted into cross bores the form of a U-shaped staple-like metal member 27 30 and 31 respectively in the inner ends of the pins. With the use of a hammer or similar tool, a workman may bend the extremities of the legs of the keeper cover into a dotted line position as illustrated in Figure 3 to lock the keeper in position and thus retain the pins from accidental removal. In instances where the chain in which the leg is placed may be dragged through material to be excavated, the ends of the pins may be provided with a groove 35 as indicated in Figure 3 to receive the bent over portion 28 of the retaining keeper as illustrated in dotted outline (lefthand side Figure 3). Should it be desired to remove the pins and disassemble the chain link, similar hammer blows may be used to straighten the legs of the keeper so that it may be manually removed from the cross bores and the pins permitting the parts to be disassembled.

Obviously a complete chain may be made of links formed as shown in the drawings of the present invention. All parts, with the exception of the keeper 27, are ordinarily formed of cast steel so that the repair link is quite economical from the standpoint of manufacture. The combination of the obround pins in mating apertures and the nose portion on the eye portions of the half links prevent the link from pivoting about the pins so that the repair link is as rigid longitudinally as an ordinarily formed link of a chain. Great strength is retained in the repair link since the ends of each half link are rigidly joined. The similar links thus balance the forces applied across either leg of the chain link.

While I have shown and described a particular embodiment of my invention, it is to be understood that it is capable of many modifications. Changes, therefore, in the construction and arrangement may be made without departing from the spirit and scope of thte invention as disclosed in the appended claims.

I claim:

1. A chain link, comprising: two interchangeable half links cast of a hard material, difficult to machine, each having a U-shaped body portion with an eye portion at one extremity and a pair of spaced apertured ears at the other extremity, each eye portion being receivable between the ears of the other half link with the apertures and eye in lateral alignment; a pair of pins removably positioned in said aligned apertures and eye to secure said half links together, each pin having a cross bore therein adjacent its inner end the pins being generally aligned with each other and the cross bores being spaced laterally; and a manually bendable U-shaped keeper positioned with its legs in said cross bores to hold the pins in said securing position.

2. A chain link, comprising: two half links cast of manganese steel and of generally the same shape and size, each half link being of U-shape and having a pair of spaced apertured ears at one extremity and an apertured eye portion at the other extremity, said eye portion fitting between the ears of the other half link with the apertures in lateral alignment the apertures being generally obround; a pair of headed pins having a generally obround cross section one in the laterally aligned apertures of each eye and adjacent ears with the head on the outer side of the link, each pin having an inner cross bore, the pins being generally aligned with each other and the cross bores being spaced laterally from each other; and a keeper of generally U-shape having its legs respectively in said cross bores, the extremities of said keeper being manually bendable to selectively lock the pins in said apertures and retain the half links together.

References Cited in the file of this patent

UNITED STATES PATENTS

| | | |
|---|---|---|
| 466,080 | Miller | Dec. 29, 1891 |
| 1,513,739 | Adams | Nov. 4, 1924 |
| 1,933,653 | Bremer | Nov. 7, 1933 |
| 1,986,586 | Lovenston | Jan. 1, 1935 |
| 2,638,790 | Perron | May 19, 1953 |

FOREIGN PATENTS

| | | |
|---|---|---|
| 933,961 | France | May 7, 1938 |